United States Patent [19]

Neumann et al.

[11] Patent Number: 4,472,184
[45] Date of Patent: Sep. 18, 1984

[54] SUPPORT AND HOLDING FRAME FOR AIR FILTERING ELEMENTS

[75] Inventors: Gerhard M. Neumann; Jochen Karelin, both of Berlin, Fed. Rep. of Germany

[73] Assignee: Delbag-Luftfilter GmbH, Fed. Rep. of Germany

[21] Appl. No.: 495,817

[22] Filed: May 18, 1983

[30] Foreign Application Priority Data

May 18, 1982 [DE] Fed. Rep. of Germany ... 8214792[U]

[51] Int. Cl.³ .............................................. B01D 46/00
[52] U.S. Cl. ...................................... 55/481; 55/493; 55/497; 55/DIG. 31
[58] Field of Search ............... 55/480, 481, 484, 483, 55/493, 497, 501, DIG. 31; 312/257 SM, 315, 326

[56] References Cited

U.S. PATENT DOCUMENTS

| 518,567 | 4/1894 | Figgins | 312/315 |
| 2,907,407 | 10/1959 | Engle | 183/71 |
| 3,537,242 | 11/1970 | Bennett | 55/493 |
| 4,023,944 | 5/1977 | Beane | 55/493 X |
| 4,225,328 | 9/1888 | Stiehl | 55/497 X |

FOREIGN PATENT DOCUMENTS 1507784 5/1970 Fed. Rep. of Germany .
2751640 5/1979 Fed. Rep. of Germany .

Primary Examiner—Charles N. Hart
Attorney, Agent, or Firm—Basile, Weintraub & Hanlon

[57] ABSTRACT

A support and holding frame for supporting an air filtering element of the type that is of the nonself-supporting type. The invention comprises a frame adapted to hold the filtering element and consists of a three-sided sheet metal box having its upper and lower surfaces provided with bent edges directed toward the inside of the box to serve as flange supports for the filtering element. A pivotal door is provided on one side to permit simple access for insertion and removal of the filtering element.

2 Claims, 3 Drawing Figures

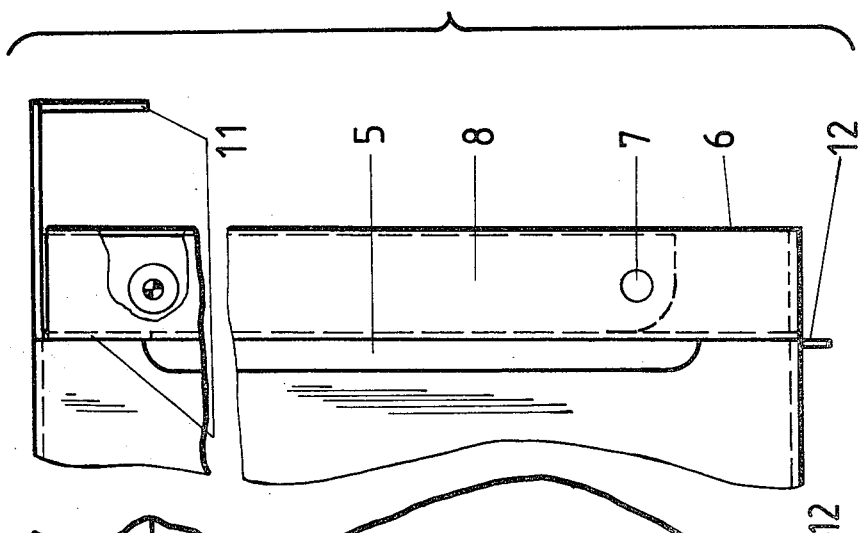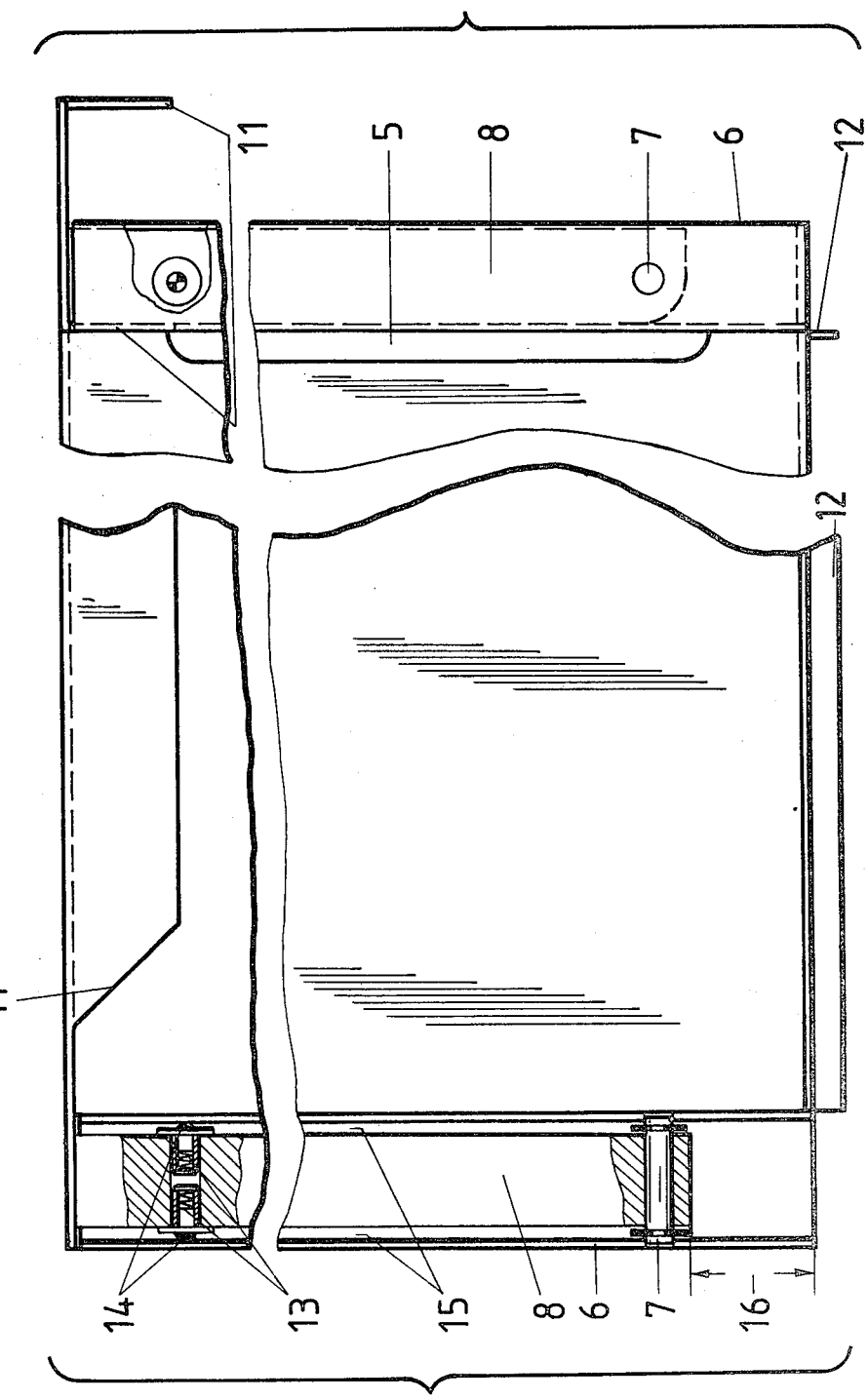

SUPPORT AND HOLDING FRAME FOR AIR FILTERING ELEMENTS

BACKGROUND OF THE INVENTION

I. Field of the Invention

This invention relates to a frame for supporting and holding a non-self-supporting air filtering elements for installation in wall frames or housings with or without maintenance protection.

II. Description of the Prior Art

The purpose of this support and holding frame is to add rigidity to predominantly flexible or compressible filter elements in filter housings or wall frames. By means of a certain height of these frames, the respective distance between pressing device and ceiling edge is simultaneously lined or equalized.

This type of frame is necessary where the non-self-supporting filter bodies are flexible in all directions and which are, in part, exchanged under clear protective bags. Flexible filter bodies or filter inserts are preferred in those areas of application in which the possible disposal of the used filters offer corresponding prerequisites for reducing the disposal volume several times. In many cases this is due for direct charging of incinerators or of the long-term storage in waste containers. Prior to these processes, the saturated filter inserts are cut, pressed or are precompacted from all sides in a compactor.

It is known, for example, to use rigid support frames from which flexible and compressible filter elements are taken which are subsequently processed into compact waste by means of volume reduction. Examples of such various filters with frames are described by the following printed matter: German Published Application No. 1 507 784, German Published Application No. 2 751 640, and U.S. Pat. No. 2,907,407. Some of these known and holding frames are equipped with a hinge flap at the front in order to be able to directly removed the filter elements from the horizontal plane in the pulling direction.

Previous designs fail to utilize such frames in a manner that they can be safely handled and operated. If the dust saturated or contaminated frames remaining in the housings are treated with decontaminants, residues of these materials adhere in the corners. This condition very quickly results in corrosion damage. Since the filter elements are also removed from the support and holding frames through a protective bag, it is necessary to facilitate easier manipulation by way of installations on the support frame.

SUMMARY OF THE INVENTION

This invention discloses a simplified frame for air filtering elements. The invention presents a useful handling means whereby the box-like, single-piece, bent frame which takes the flexible element is equipped at the top and the bottom with right angle edges which are directed toward the inside. It is equipped at the three side surfaces with centrally arranged spacers which protrude toward the outside. U-shaped sheet metal pieces which are opened toward the front are welded to the recessed front edges of the frame which are designed for the recessed installation of the square profiles. The square profile is equipped with bolts and linked in a hinge-like manner. The profiles are equipped on both sides with spring-type ball compression pieces which fit into the holes and are connected with each other by a crosswise U-shaped strip. The vertical legs of the U-shaped strip have a somewhat slanted side edge form on both the front and back side, whereas the front side of the frame is connected and made rigid by a lower angle profile, the downward side of which is bent at an angle.

In an additional version of this invention, ball-type compression pieces are installed in threaded holes in the square profile supports which can be tipped down and stopped, consists of pins and springs by which their balls locked on both sides are in resilient contact with the inside parts of the two U profiles. The square pieces are shorter than the U-shaped metal pieces in the lower part of the profiles by an amount of 25-40 mm.

DESCRIPTION OF THE DRAWINGS

FIG. 2 is a fragmentary, partially sectioned front view; and

FIG. 3 is a fragmentary side view.

DESCRIPTION OF THE PREFERRED EMBODIMENT

Figure 1:
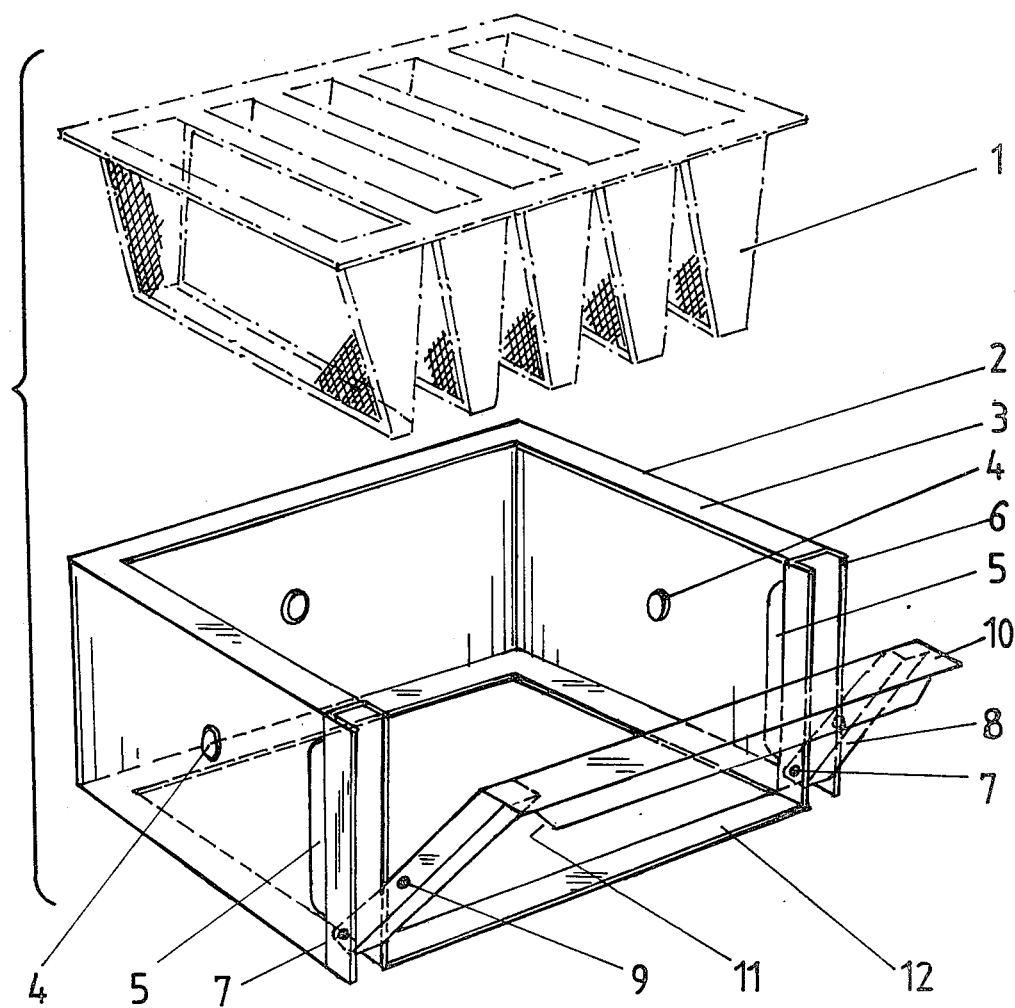
FIG. 1 is an exploded, perspective view of the invention.

According to FIG. 1 the support and holding frame 2, which holds the filter element 1, initially consists of a sheet metal box, the edges of which 3 are bent toward the inside at a right angle on three upper and lower sides. These serve as flange supports and to hold the flexible filter element 1 in the operational position and to transfer the compressive forces of the clamping device against the gasket facilities of the installation housing (not illustrated). Protruding spacers 4 for fixing the filter in position in the housing are located along the three sides of the boxes. At the front side of the sheet metal box, frame 2 is equipped with releases 5 on both sides in order to save the weld when the U-shaped sheet metal strips 6 are installed with the open side towards the front.

Fastened in these two U-shaped sheet metal strips 6 with some side play between parts 8 and 15 (FIG. 2) are square profiles 9 in a rotatable manner by one bolt 7 each. The square profiles are connected with each other by a cross-wise U-shaped sheet metal strip 10. The forward and backward edge 11 is somewhat slanted on the two outer sides.

Approximately in the center of every square profile 8—as seen in FIG. 2—are threadingly inserted two commercially available ball pressure pieces with pin and spring 13 and 14 per threaded hole on the right and left which cause a resilient stop when the forward part of the frame is tipped back in the U-profile strips 6. This prevents the forward part of the frame from falling out toward the front during the filter operation. The distance 16 between the edge of the lower U-shaped sheet metal 6 to the lower edge of the square profile 8 is approximately 25-40 mm. If the front side of the frame is completely tipped forward around the pivot point of bolt 7, the inserted filter element can be pulled out or pushed in without lifting and without injuring the gasket of filter 1 which is located on the top.

FIG. 3 is a section through the front part of the frame and illustrates in greater detail the position of bolts 7 or, alternately, the ball pressure pieces and the shape of the U-profile strip 11.

The advantage of this support and holding frame over previous devices is simplified construction and handling. The device is universally applicable for the horizontal and vertical, positionally independent installation in corresponding wall frames or installation housings.

During a maintenance with protective bag, this frame and the filter element contained therein can be easily serviced under the bag foil. Such service will not cause depositions during decontamination with solvents or cleansers. This is also valid where the support and holding frame continuously remains in the housing as a so-called padding frame.

We claim:

1. A frame for supporting and holding non-self-supporting air filter elements for installation in wall frames or housing with or without maintainance protection having a box-like single-piece, bent frame (2) containing a flexible filter element (1) comprising:
   top and bottom right angular edges;
   the angular edges bent toward the interior (3) of the frame;
   centrally arranged spacers (4);
   the spacers protruding toward the outside along three side surfaces;
   two recessed front edges (5) of the frame;
   U-shaped sheet metal strips (6) which are open toward the front;
   the two recessed front edges welded to the U-shaped metal strips;
   square profiles (8) recessingly installed in the U-shaped sheet metal strips; coupled with bolts (7) in a hinge-like manner;
   ball pressure pieces (9) located on the square profiles;
   the ball pressure pieces having springs on both sides;
   a crosswise U-profile strip (10), connecting the springs;
   the crosswise U-profile strip having vertical legs which have a somewhat slanted side edge (11) on the outside front and back;
   a connecting lower angled profile (7) for rendering the front side of the frame rigid having a leg which is angled toward the bottom.

2. The frame of claim 1 wherein
   the square profile supports (8) have threaded holes which contain the ball pressure pieces;
   the square profile supports capable of being tipped down and stopped;
   a stopping means consisting of pins and springs (13);
   the pins and springs in spring-type contact with their balls (14) are locked on both sides along the inside of the U-profiles (15);
   the square profiles (8) being approximately 25–40 mm shorter in the lower profile range than the U-shaped sheet metal strips (6).

* * * * *